(12) United States Patent
Reineke

(10) Patent No.: US 7,467,495 B2
(45) Date of Patent: Dec. 23, 2008

(54) VEHICLE SEAL WITH DISCONTINUOUS ALTERATING SOFT AND RIGID U-SHAPED SEGMENTS AND METHOD OF FORMING SAME

(75) Inventor: Frank Reineke, Ronnenberg (DE)

(73) Assignee: TROESTER GmbH and Co. KG, Hannover (DE)

( * ) Notice: Subject to any disclaimer, the term of this patent is extended or adjusted under 35 U.S.C. 154(b) by 673 days.

(21) Appl. No.: 10/648,876

(22) Filed: Aug. 27, 2003

(65) Prior Publication Data

US 2006/0066060 A1    Mar. 30, 2006

(30) Foreign Application Priority Data

Sep. 3, 2002   (EP)   ................................. 02019619

(51) Int. Cl.
*E06B 7/232*  (2006.01)

(52) U.S. Cl. .................. 49/490.1; 49/506; 49/475.1

(58) Field of Classification Search ................ 49/475.1, 49/490.1, 506; 428/34.1, 35.7, 122, 174, 428/156; 156/244.11
See application file for complete search history.

(56) References Cited

U.S. PATENT DOCUMENTS

| | | | | |
|---|---|---|---|---|
| 4,676,856 A | * | 6/1987 | Shigeki et al. ............... | 156/201 |
| 5,331,767 A | * | 7/1994 | Takeuchi et al. ............ | 49/490.1 |
| 5,741,573 A | * | 4/1998 | Malm .......................... | 428/83 |
| 6,024,906 A | * | 2/2000 | Cook ........................ | 264/177.2 |
| 6,652,952 B2 | * | 11/2003 | Drozd et al. ................ | 428/122 |
| 6,742,255 B1 | * | 6/2004 | Frappier ..................... | 29/888.3 |
| 2002/0144466 A1 | * | 10/2002 | Gopalan et al. ............ | 49/475.1 |

* cited by examiner

*Primary Examiner*—Gregory J. Strimbu
(74) *Attorney, Agent, or Firm*—Myron Greenspan; Lackenbach Siegel LLP

(57) ABSTRACT

A strand-form vehicle seal is equipped with a flexible reinforcement with a substantially U-cross section. The flexible reinforcement includes at least two different substances formed of individual sections of a nonmetallic, soft-elastic material together with individual sections of another nonmetallic, however dimensionally stable and hard or rigid material. The individual sections in the reinforcement are interrupted and disposed intermittently each alternating one after the other along the direction of the reinforcement. The rigid sections form the clamping portions of the reinforcement. The soft elastic sections disposed between them lend flexibility to the reinforcement. In this manner, the vehicle seal is easier to process, dispose of and recycle. A method is also disclosed for making the seal.

17 Claims, 3 Drawing Sheets

Figure 1:
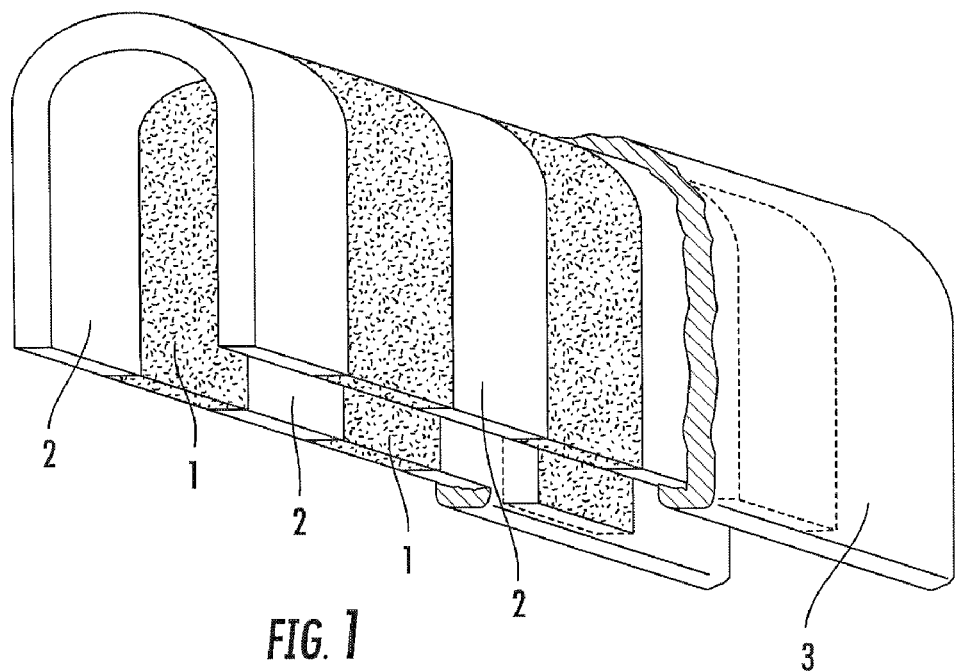

VEHICLE SEAL WITH DISCONTINUOUS ALTERATING SOFT AND RIGID U-SHAPED SEGMENTS AND METHOD OF FORMING SAME

BACKGROUND OF THE INVENTION

1. Field of the Invention

The invention relates to a strand-form vehicle seal, which is equipped with a flexible reinforcement with U- or C-form cross section, or one which can be derived therefrom, as well as method and devices for its production.

2. Description of the Prior Art

When assembling the body parts of motor and other vehicles and at sites at which movable body parts are in contact on non-movable body parts, seals are required at many sites to prevent the penetration of water, exhaust gases, dust and/or draft into the interior of the vehicle. These seals are comprised of sealing strips between the individual parts, which are produced continuously and which, for installation, are cut to the requisite lengths.

Within prior art these sealing strips are most often produced with a metallic reinforcement in the form of emplaced wires (EP 11 53 799) or of stamped sheet metal strips wound out from a roll and bent into the required form, as reinforcement and a sheathing of an extruded elastic composition. GB 23 27 699 A discloses a strand-form vehicle seal, comprised of a single extrudate, which at least at the bent corners ensheathes a prefabricated reinforcement preferably produced of metal in the form of a stamped sheet.

Another method of production in prior art consists of round wires bent meander-form, which are joined together with textile filaments and which are also ensheathed by an extruded elastic composition. The working of such strips into the U-form required for a sealing profile takes place continuously in several steps, most often in driven roller systems.

The production of these sealing strips is elaborate and expensive, the use of metal as reinforcement of the elastomer composition is often of disadvantage in the subsequent processing and utilization of the strand-form vehicle seal. The disposal and any recycling entails difficulties.

SUMMARY OF THE INVENTION

The invention avoids the disadvantages of prior art. It addresses the problem of providing with simple means a recyclable seal without metallic rigidity supports whose fabrication and processing is simpler and which can be produced in simply structured machines.

The vehicle seal according to the invention with a flexible strand-form reinforcement is distinguished thereby that the reinforcement forms a strand of at least two different stock substances which is comprised of individual sections of a nonmetallic soft-elastic material together with individual sections of another nonmetallic, however dimensionally stable and rigid, material, and the individual sections of the reinforcement are disposed intermittently alternating one after the other.

The parts of the reinforcement comprised of a nonmetallic, however dimensionally stable and rigid, material with U- or C-form cross section, or one derivable therefrom, form the clamping parts of the reinforcement, the soft elastic sections disposed between them lend flexibility to the reinforcement and both contiguous types of sections of the reinforcement are embedded entirely or partially into the soft material of the vehicle seal and form with it a profile strand.

The dimensionally stable and rigid material of the reinforcement receives through the U- or C-form cross sectional form the capability of being clamped tightly on the body parts of the vehicle, whereby the securement of the strip-form vehicle seal on the vehicle becomes possible.

In this way a metal-free strand-form vehicle seal is obtained which is easier to process, to dispose of and to recycle. The vehicle seals are placed onto a projecting edge, but they can also be set into a groove.

Depending on the requirements in practice made of the seals, depending on the straight and the curved courses of the seal installed in a vehicle, it can be useful, if the sections of the nonmetallic, however soft-elastic, material comprises another or identical length than the sections of the nonmetallic, however dimensionally stable and rigid material.

Depending on the type of vehicle to be equipped with this seal, it can be useful if the lengths of the sections of the nonmetallic, however soft-elastic, material and/or the lengths of the sections of the nonmetallic, however dimensionally stable and rigid, material vary within the strand.

In this strand-form vehicle seal it is useful that the nonmetallic, however soft-elastic, material is a thermoplastic elastomer and that the nonmetallic, however dimensionally stable and rigid, material is a synthetic material.

In this strand-form vehicle seal the reinforcement strand is advantageously sheathed entirely or partially with one or an additional soft or synthetic material.

The additional soft or synthetic materials can enclose entirely or partially at least one hollow volume.

The method for the production of this strand-form vehicle seal, which is equipped with a flexible reinforcement having a U- or C-form cross section, or one derived therefrom, is distinguished thereby that the reinforcement is formed as a strand of at least two different substances, in that a nonmetallic, soft-elastic material is formed out in individual sections together with another nonmetallic, however dimensionally stable and rigid, material in individual sections with the individual sections being disposed intermittently, however, alternating one after the other.

This is a simple production process in extrusion as well as also in injection molding for the reinforcement, which can also be carried out in a single working pass by an additional extrusion step to the finished vehicle seal.

As the nonmetallic soft-elastic material advantageously a thermoplastic elastomer can be utilized and as the nonmetallic dimensionally stable and rigid material, a synthetic material.

The lengths of the sections of the nonmetallic soft-elastic material and the lengths of the sections of the nonmetallic dimensionally stable and rigid material within the strand can have identical and also nonidentical lengths, the lengths of the strand sections can be varied during the production of the strand, depending on the requirements at sites to be bent in certain radii.

But devices for the production of a strand-form vehicle seal according to the invention form the subject matter of the invention.

A device for the production of this strand-form vehicle seal, which is equipped with a flexible reinforcement with U- or C-form cross section or one derived therefrom, with the reinforcement strand being formed at least of two different substances, which as individual sections are disposed intermittently, alternating one after the other, comprises at least two extruders and a common injection head and is distinguished thereby that between the two extruders and the common injection head an intermittence device is disposed, which divides the strands of the two extruders and which presses the divided extrudate compositions continuously alternating one after the other into the common injection head.

The intermittence device can comprise two rotors, which at their circumference have recesses and between these recesses projections, with the projections of the one rotor extending into the recesses of the other rotor, that the geometric form of the projections and the recesses is selected such that the circumference of the projection rolls out on the circumference of the recess into which it extends, and in the process the volume in this recess between the circumference of the recess and the circumference of the projection is decreased, and that in the housing a stationary opening leading to the injection head at the site of the chamber formed by the inner circumference of the recess and the outer circumference of the projection is provided for the discharge of the extrudate from this chamber with continuously changing volume.

Advantageous Embodiments of this Device Comprise that the flanks of the chambers have involute form, whose productions can be readily mastered and which makes possible a relatively low-wear working, that each rotor (12, 13) has its own drive and therewith makes a common gearing superfluous, that the intermittence device comprises at least one bypass which can be actuated on and off for the sequential actuating on and off of the soft and/or hard component such that the lengths of the sections can be readily controlled, that the rotors can be exchanged pairwise against others with a different fill volume in order to be able to produce diverse seals, that the rotors are equipped with identical or different chamber volumes in order to be able to vary the size of the seals, that the rotors are supported in friction bearings or roller bearings in order to be able to work as abrasion-free as possible.

BRIEF DESCRIPTION OF THE INVENTION

Figure 2:
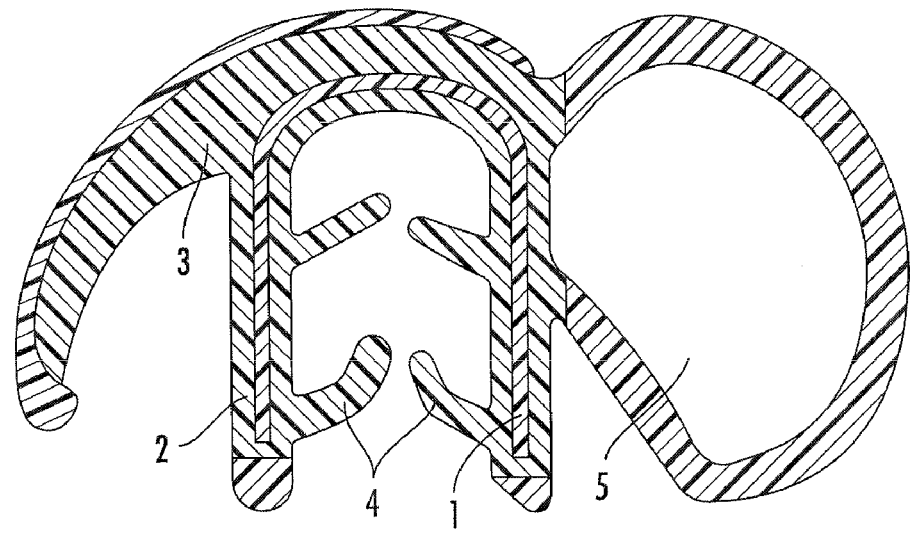
Figure 3:
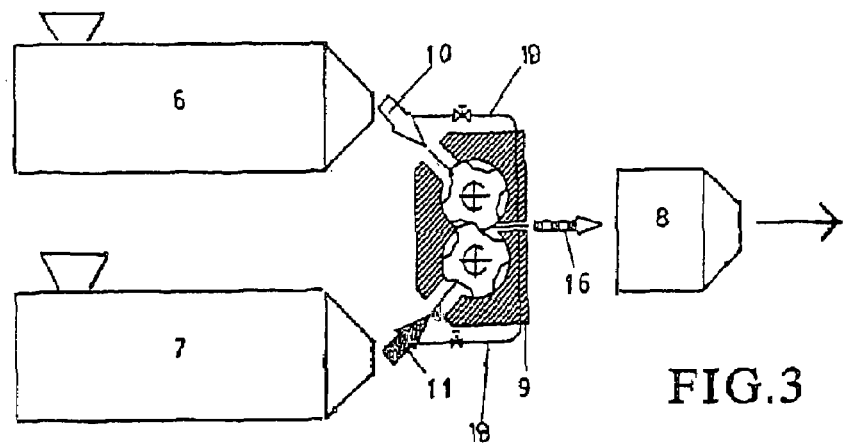
Figure 4:
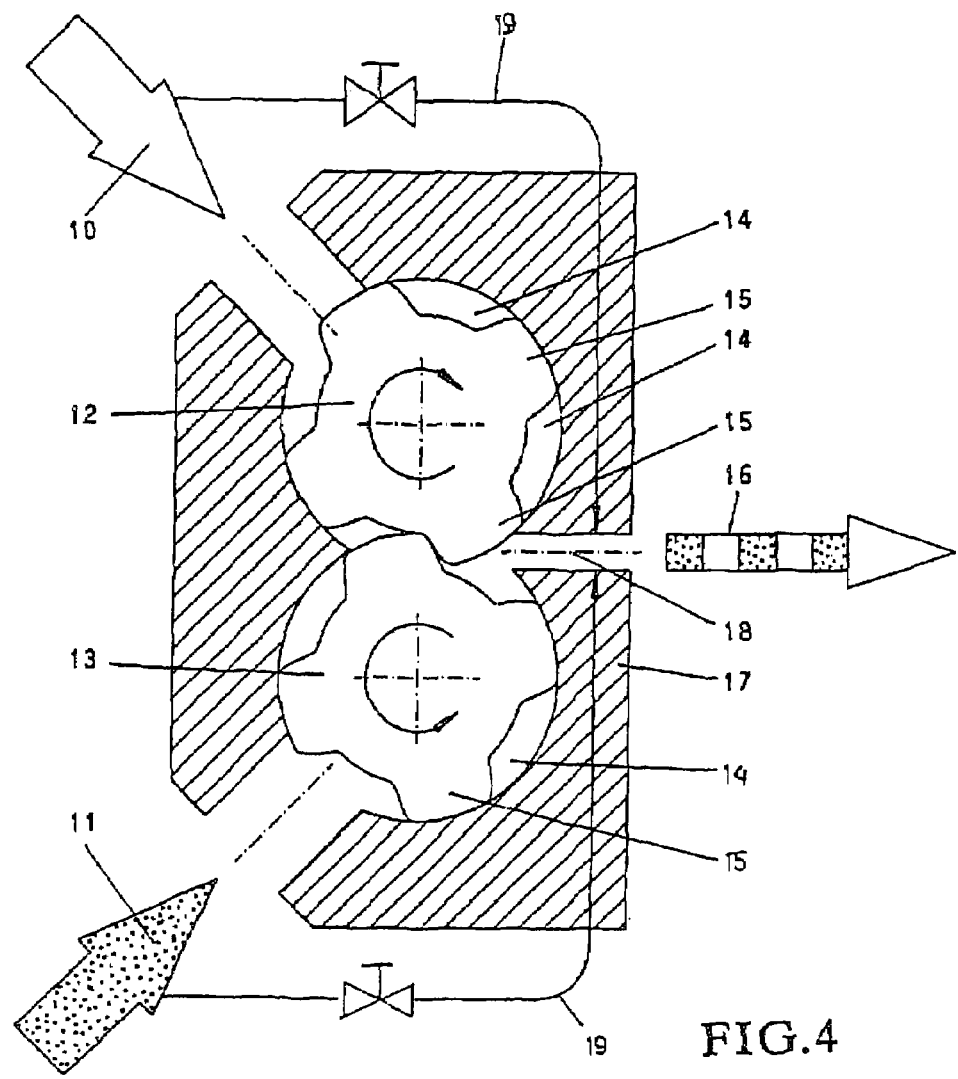

In the following the essence of the invention will be explained in further detail in conjunction with an embodiment example shown schematically in the drawing. Therein depict:

FIG. 1 view of a profile strand used as a basis,

FIG. 2 a cross section through a profile strand provided with a sheathing, the left half with a reinforcement part of hard substance, the right half with a reinforcement part of soft substance, FIG. 3 an extrusion installation for the production of the strand-form vehicle seal, FIG. 4 the intermittence device of this installation in section, view similar to FIG. 1 but where sections have different lengths.

Figure 5:
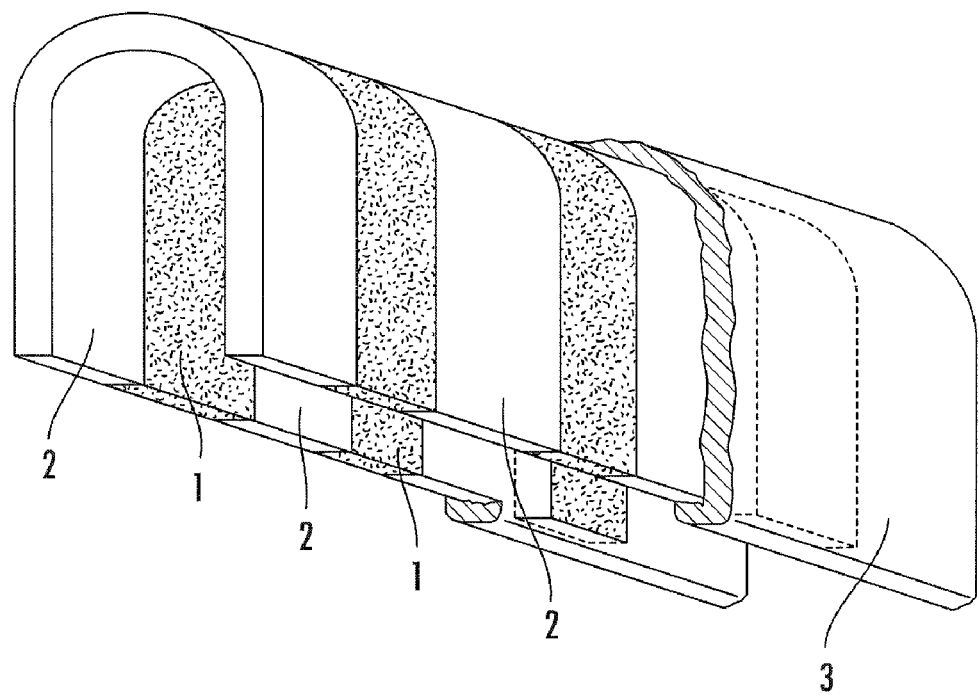

FIG. 5 view similar to FIG. 1 but where sections have different lengths.

DETAILED DESCRIPTION OF THE INVENTION

The seal strand depicted in FIG. 1 comprises an intermittently extruded soft elastic composition or sections 1, between whose parts are located bodies or sections 2, U-form in cross section, as a reinforcement, which are comprised of a harder, also extruded, synthetic material, which are disposed spaced apart from one another between the parts of the soft elastic composition 1. These bodies 2 serving as reinforcement have low elasticity, but greater hardness. This seal strand is sheathed in an additional elastic composition 3, which is also applied in an extrusion process. This additional synthetic material composition 3 can, as shown in FIG. 2, comprise seal lips 4 and enclose a hollow volume 5. This seal strand can be produced in the most diverse dimensions and cross sectional forms and can be ensheathed entirely or partially in highly diverse extrudable materials.

As shown in FIGS. 1 and 5, the section 1 and 2 can have the same, different or varying lengths along the longitudinal length direction of the seal strand.

The seal lips 4 and hollow volumes in the manner of the hollow volume 5 can however also be produced integrally with the elastic composition 1 in extrusion processes.

FIG. 3 shows an extrusion installation for the production of a sealing strip comprised of two extrudable materials, in which the one material of the sections 1 is disposed intermittently between the other material of sections 2, as is shown in FIGS. 1 and 2. This installation comprises two extruders 6, 7 and a common injection head 8. It is distinguished thereby that between the two extruders 6, 7 and the injection head 8 a device 9 is disposed, which divides the strands 10, 11 of the two extruders 6, 7 into sections extending transversely to the strand axis and presses the divided extrudate compositions in continuous change one after the other into the common injection head 8.

This device 9 shown in FIG. 4 and disposed between the two extruders 6, 7 and the injection head 8, which serves for the division and the intermittence of the two extrudate strands 10, 11 and for joining together of the intermitted parts to form a new strand 16, is comprised of two rotors 12, 13 which have at their circumference recesses 14 and between these recesses 14 projections 15, with the projections 15 of the one rotor 12 or 13 extending into the recesses 14 of the other rotor 13 or 12. The geometric form of the projections 15 and recesses 14 is selected such that the circumference of the projection 15 in each instance rolls out on the circumference of the recess 14 into which it extends, and, in the process, the volume present in this recess 14 between the circumference of the recess 14 and the circumference of projection 15 decreases. In housing 17 is disposed a channel 18 leading to the injection head 8, which starts at the site of the interdigitation of the projections 15 and the recesses 14 of rotors 12, 13 and leads to the injection head 8. The two rotors 12, 13 operate similarly as a tooth wheel pump: they intermittently join the materials expressed from the two extruders 6, 7, because they successively, once, press out the material stored in the recess 14 of rotor 12 and, subsequently, the material stored in the recess 14 of rotor 13 in continuous succession and conduct it further through the channel 18 to the injection head 8.

This material, passed through rotors 12, 13 and pressed out of the injection head, when it enters into the injection head 8 comprises a strand 16, which in continuous succession and continuous change of a strand piece of soft extrudate and a strand piece of dimensionally stable and rigid material.

Bypasses 19 can be provided, which circumvent the path of the extruded materials via the rotors 12, 13.

LIST OF REFERENCE NUMBERS

1 Section of soft-elastic material
2 Section of dimensionally stable and rigid material
3 Sheath of elastic composition
4 Seal lips
5 Hollow volume
6 Extruder
7 Extruder 8 Injection head
9 Intermittence device
10 Extrudate strand
11 Extrudate strand
12 Rotor
13 Rotor
14 Recess in rotor 12 and 13
15 Projection in rotor 12 and 13
16 Strand combined intermittently
17 Housing
18 Channel
19 Bypass

The invention claimed is:

1. A strand-form vehicle seal, equipped with a flexible reinforcement that defines a longitudinal direction and has a uniform generally U-shaped cross section in planes generally normal to said longitudinal direction, wherein said flexible reinforcement comprises first individual sections (1) of a nonmetallic, generally soft elastic first material having a predetermined hardness and second individual sections (2) of a nonmetallic dimensionally stable, generally rigid second material having a hardness greater than said predetermined hardness, wherein said first material being different from said second material and said first and second sections (1, 2) of the flexible reinforcement each have said U-shaped cross-section and are continuously and homogenously formed by a respective one of said first and second materials from one distal end of said U-shaped cross-section to an opposing distal end of said U-shaped cross-section, and said first and second sections alternating one after the other along said longitudinal direction with successive said first sections being fully separated from each other by adjacent said sections and successive said second sections being fully separated from each other by adjacent said first sections.

2. A strand-form vehicle seal as claimed in claim 1, wherein the first material forming said first sections is a thermoplastic elastomer.

3. A strand-form vehicle seal as claimed in claim 1, wherein the nonmetallic second material forming said second sections is a synthetic material.

4. A strand-form vehicle seal as claimed in claim 1, wherein said flexible reinforcement is entirely or partially encapsulated with one or several or synthetic materials (3).

5. A strand-form vehicle seal as claimed in claim 4, further comprising at least one hollow volume.

6. A strand-form vehicle seal as claimed in claim 1, wherein a length of said first sections is different from a length of said second sections.

7. A strand-form vehicle seal as claimed in claim 1, wherein the lengths of at least one of said sections vary.

8. A strand-form vehicle seal as claimed in claim 1, wherein said first sections have the same length as said second sections.

9. A method for producing a strand-form vehicle seal, which is equipped with a flexible reinforcement that defines a longitudinal direction and has a uniform generally U-shaped cross section in planes generally normal to said longitudinal direction, wherein the method comprises the steps of forming said flexible reinforcement as first individual sections of a nonmetallic, generally soft-elastic first material having a predetermined hardness and second individual sections of a nonmetallic dimensionally stable, generally rigid second material having a hardness greater than said predetermined hardness, the first and second sections (1, 2) alternating one after the other along said longitudinal direction with successive said first sections being fully separated from each other by adjacent said second sections and successive said second sections being fully separated from each other by adjacent said first sections, said first material being different from said second material and each of said sections having said U-shaped cross-section and being continuously and homogenously formed by a respective one of said first and second materials from one distal end of said U-shaped cross-section to an opposing distal end of said U-shaped cross-section.

10. A method as claimed in claim 9, wherein said reinforcement is formed by an injection molding process.

11. A method as claimed in claim 9, wherein said reinforcement is formed by an extrusion process.

12. A method as claimed in claim 11, wherein said nonmetallic second material forming said second sections is a synthetic material.

13. A method as claimed in claim 11, wherein the nonmetallic first material forming said first sections is a thermoplastic elastomer.

14. A method as claimed in claim 9, wherein said reinforcement is entirely or partially encapsulated with one or more synthetic materials (3).

15. A method as claimed in claim 9, wherein said first sections have the same length as said second sections.

16. A method as claimed in claim 9, wherein a length of said first sections is different from a length of said second sections.

17. A method as claimed in claim 9, wherein the lengths of at least one of said sections vary.

* * * * *